United States Patent
Ren

(10) Patent No.: US 9,232,050 B2
(45) Date of Patent: Jan. 5, 2016

(54) VISUAL VOICEMAIL SCALABILITY TEST

(75) Inventor: Dahai Ren, Lincoln, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 882 days.

(21) Appl. No.: 13/457,843

(22) Filed: Apr. 27, 2012

(65) Prior Publication Data

US 2013/0287183 A1    Oct. 31, 2013

(51) Int. Cl.
*H04M 1/24*    (2006.01)
*H04M 3/22*    (2006.01)
*H04M 3/53*    (2006.01)

(52) U.S. Cl.
CPC .......... *H04M 3/2263* (2013.01); *H04M 3/5315* (2013.01); *H04M 2203/251* (2013.01)

(58) Field of Classification Search
CPC .................................. H04M 3/22; H04M 3/30
USPC ............ 379/26.01, 27.01, 26.02, 29.1, 32.01, 379/133, 144.08, 27.03, 27.04, 112.1, 381
See application file for complete search history.

(56) References Cited

U.S. PATENT DOCUMENTS

2009/0147778 A1*    6/2009    Wanless et al. ............... 370/389
2013/0017804 A1*    1/2013    Jun et al. ....................... 455/410

* cited by examiner

*Primary Examiner* — Yosef K Laekemariam

(57) ABSTRACT

A method includes identifying a peak interval traffic intensity for visual voicemail (VVM) services in a network. The method includes identifying a plurality of user devices available for implementing scalability testing. A number of requests for VVM services during a prospective time for scalability testing in the network is also identified. The method includes determining a number of additional requests for VVM services from the plurality of user devices that approximates the peak interval traffic intensity during the prospective time for scalability testing in the network. The method also includes determining instructions for at least one of the plurality of user devices to provide the determined number of additional requests. The determined instructions are sent to the at least one of the plurality of user devices.

20 Claims, 8 Drawing Sheets

SCALABILITY INSTRUCTION TABLE 600

| MDN 602 | APPLICATION ID 604 | TASK STATUS 606 | PURPOSE 608 | TIME 610 | REQUESTS 612 |
|---|---|---|---|---|---|
| MDN1 | //VZWVVMBB5001:VVM | 1 | SCALE | 0315AMEST11202011 | TRY3INTERVAL5 |
| MDN2 | //VZWVVMBB5001:VVM | 1 | SCALE | 0315AMEST11202011 | TRY3INTERVAL5 |
| MDN3 | //VZWVVMBB5001:VVM | 1 | SCALE | 0315AMEST11202011 | TRY3INTERVAL5 |
| MDN4 | //VZWVVMBB5001:VVM | 1 | SCALE | 0320AMEST11202011 | TRY3INTERVAL5 |
| MDN5 | //VZWVVMBB5001:VVM | 1 | SCALE | 0320AMEST11202011 | TRY3INTERVAL5 |

FIG. 6

VISUAL VOICEMAIL SCALABILITY TEST

BACKGROUND

Visual voicemail provides a listing of voicemail messages in a visual interface. Visual voicemail allows the user to select and manage the listed voicemails including performing operations, such as initiating playback, storage, and other functions for the voicemail based on commands entered in association with the listed voicemail in the visual interface.

Software life cycle testing, i.e., implementation testing of machine-readable instructions, may be divided into three phases: a system integration test phase, a staging phase, and a production phase. The system integration test phase is a process of verifying synchronization between two or more software systems and that may be performed after completion of preliminary software integration. The staging phase of the software life-cycle may entail testing of the software on hardware that mirrors hardware used in a production environment. The production phase is the final phase of testing and includes deploying the software in the production environment of a particular product.

BRIEF DESCRIPTION OF THE DRAWINGS

FIG. 6 is a diagram of an exemplary message table;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for implementing production scalability testing for visual voicemail services. The methods disclosed allow testing of applications for visual voicemail in a controlled production environment. The system and/or methods described herein may address issues observed during predetermined maintenance windows when production software is deployed.

As used herein, the terms "user," "consumer," "subscriber," and/or "customer" may be used interchangeably. Also, the terms "user," "consumer," "subscriber," and/or "customer" intended to be broadly interpreted to include a user device and/or a user of a user device.

Figure 1:
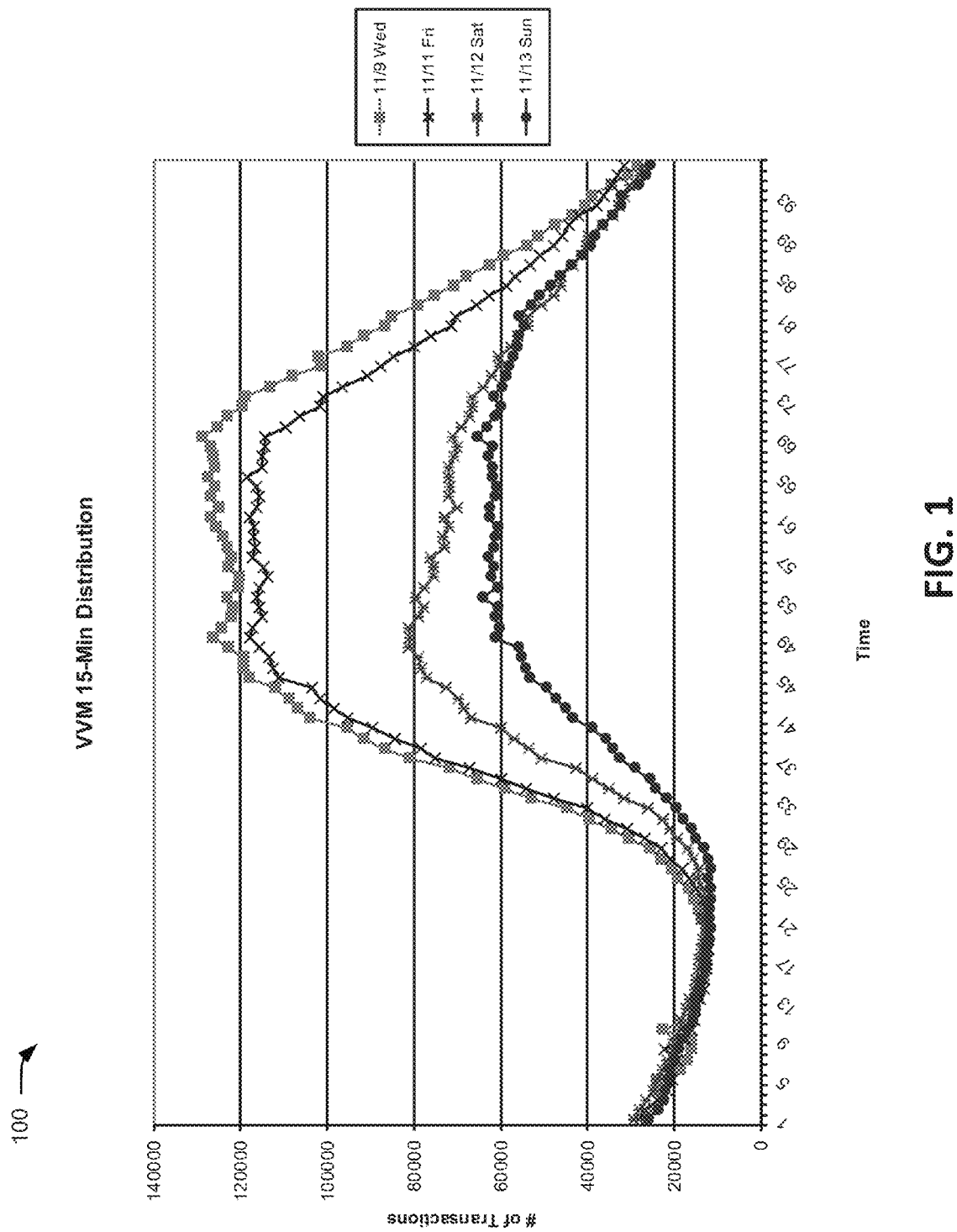
FIG. 1 illustrates a diagram of a visual voicemail usage traffic distribution.

FIG. 1 is a diagram of a visual voicemail usage traffic distribution 100. Distribution 100 illustrates visual voicemail (VVM) usage patterns associated with a service provider over 24 hour periods at 15 minute intervals, as shown on the horizontal axis, and ranging from 0 to 140,000 transactions, as shown on the vertical axis. VVM usage patterns (for four days, respectively, 11/9, 11/11, 11/12 and 11/13, as shown on the embedded legend), showing a number of transactions at 15 minute intervals are illustrated by way of example (i.e., data points represent a number of transactions each fifteen minutes).

Distribution 100 illustrates transactions in a production environment, such as network 200 described with respect to FIG. 2 below. Testing of applications in a production environment may be implemented at predetermined times, such as during a maintenance window. A maintenance window is a period of time that may be designated by technical staff (associated with the network) for preventive maintenance of the network. The maintenance window may be designated in a period of time that has low request or transaction volume (e.g., 1:00 AM to 5:00 AM) in order to minimize the possible effect of disturbances or disruptions on customers who receive service on the network. However, testing of applications during the maintenance window also reduces the applicability of results of the testing to network performance at high transaction times because of scalability. In other words, network performance at a low transaction volume may not be extrapolated (with a required degree of confidence) to network performance at high transaction volume.

In one example, described with respect to transactions in FIG. 1, applications may be tested during a predetermined maintenance window, such as from 2:00 AM to 6:00 AM. During the predetermined maintenance window, the usage volume is below 20,000 requests/15 min. During peak intervals, e.g., peak hours, from 11 AM until 6 PM, the usage volume is above 120,000 requests/15 min. In this instance, the peak interval traffic intensity is more than six times greater than the maintenance hour traffic. If an application is being requested by multiple customers in the network, the network may be rendered inoperable by congestion based on the volume of client requests during peak hours. VVM services may not be available in the network because requests to the server may either time out or be immediately rejected. In some instances, a production server may require substantial time and/or personnel hours to roll back deployment and to restore normal VVM service from the outages. The damage of production outage may be dramatically lessened if the scalability issue is uncovered during the maintenance hours.

In implementations disclosed herein, the transaction volume may be controlled in a production environment to generate a simulation of peak hour traffic, for instance during maintenance window. In contrast to testing in the staging phase in which acceptable scalability test results collected from the staging server may provide weak evidence to infer that the same software should be scalable, the methods disclosed herein provide results at high transaction volume (i.e., performance of servers in the production environment may be assessed at a production volume that is similar to peak hour traffic).

Figure 2:
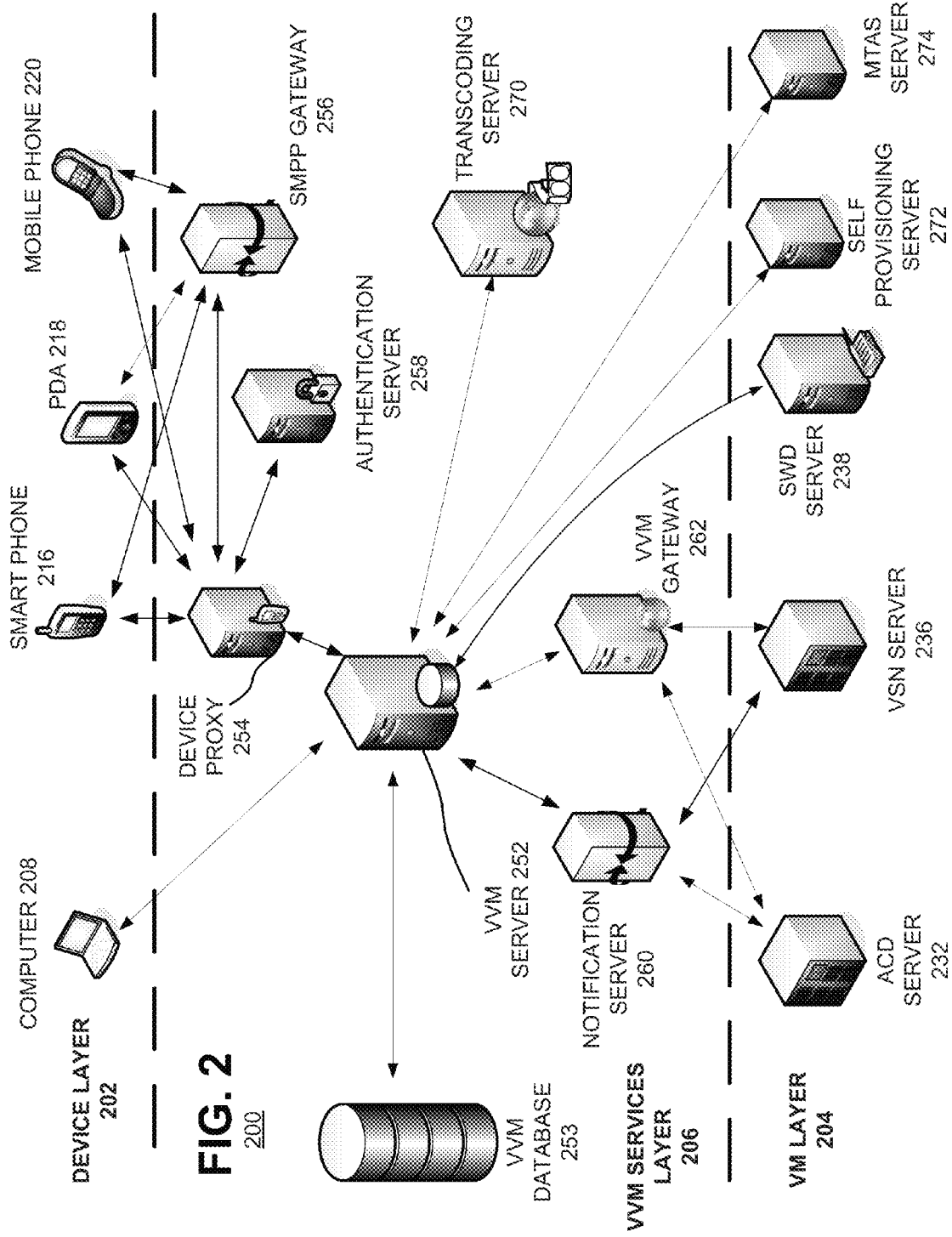
FIG. 2 illustrates an exemplary network in which systems and methods described herein may be implemented.

FIG. 2 is a diagram that illustrates an exemplary network 200 in which systems and/or methods described herein may be implemented. As shown, network 200 may include a device layer 202, a voicemail (VM) layer 204, and a visual voicemail services (VVMS) layer 206. VVMS layer 206 may lie between device layer 202 and VM layer 204 and may facilitate the implementation of VVM services in network 200.

Device layer 202 may include, for example, a computer 208, a smart phone 216 (e.g., a Blackberry™, Treo™, IPhone™, etc.), a personal digital assistant(PDA) 218, a mobile phone 220, and/or another type of communication device. Any of devices 208-220 may be considered user devices.

Computer 208 may include one or more computer systems for hosting programs, databases, and/or applications. Computer 208 may include a laptop, desktop, tablet, or any other type of computing device. Computer 208 may include an application program for navigating a network (i.e., a browser), such as the Internet, and a VVM application to receive, listen to and/or send voicemail messages.

Smart phone 216, PDA 218, and/or mobile phone 220 may allow a user to place telephone calls to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data. Rates for GSM Evolution), etc. In one embodiment, smart phone 216, mobile phone 220, and/or PDA 218 may communicate with other devices through a wireless local network using WiFi (e.g., IEEE 802.11x).

In other embodiments, smart phone 216, PDA 218, and/or mobile phone 220 may also communicate with other devices via a wired network. For example, smart phone 216, mobile phone 220, and PDA 218 may communicate with other devices using a public-switched telephone network (PSTN), the Internet, an intranet, a local area network (LAN), a wide area network (WAN), etc. Smart phone 216, PDA 218, and mobile phone 220 may include a visual voicemail application to receive, listen to, and/or send voicemail messages.

VM layer 204 may include VM servers 232 and 236 (e.g., an automated call distribution (ACD) server 232, and a voicemail service node (VSN) server 236), a service-wide directory (SWD) server 238, a self-provisioning server 272, and a Mobile Telephone Activation System provisioning server 274 (MTAS server 274).

VVMS layer 206 may include a VVM server 252, a VVM database 253, a device proxy 254, an SMPP (Short Message Peer-to-Peer Protocol) gateway server 256, an authentication server 258, a notification server 260, a VVM gateway server 262, and a transcoding server 270.

ACD server 232 and VSN server 236 may each receive and store voicemail messages mailboxes associated with one or more user devices, such as user devices 208-220. VM servers 232 and 236 may receive voicemail messages when, for example, a user does not answer a call request. VM servers 232-236 may deliver the voicemail messages when requested, for example, to one of user devices 208-220 or VVM server 252. In one embodiment, VM servers 232-236 may store video voicemail, as well as audio voicemail. In one embodiment, VVM server 252 may aggregate voicemail information from ACD server 232, and/or VSN server 236.

In one exemplary embodiment, user devices 208-220 may be associated with a single user. For example, a user may have been issued smart phone 216 and computer 208 (which may include a soft phone) by an employer to be used for work. The same user may own mobile phone 220 for personal use. The same user may also own PDA 218 that may be used as a personal address book as well as a home phone. In this exemplary embodiment, ACD server 232 may receive and store voicemail for smart phone 216 and computer 208; and VSN server 236 may receive and store voicemail for PDA 218 and mobile phone 220. Although user devices 208-220 may be associated with one user in this example, VM servers 232-236 may store voicemails for more than one user (e.g., thousands or hundreds of thousands of users).

VM servers 232-236 may notify VVM server 252 of new voicemail messages by sending messages (e.g., SMPP messages) to VVM server 252 through notification server 260. VM servers 232-236 may also provide voicemail message information (e.g., voicemail message headers) to VVM server 252 by sending messages (e.g., IMAP (Internet Message Mapping Protocol) messages) to VVM server 252 through VVM gateway 262. VM servers 232-236 may also send voicemail message audio files to devices 208-220 through VVM gateway 262, VVM server 252 and/or device proxy 254, for example.

SWD server 238 may include a database of device numbers (e.g., phone numbers, mobile device numbers, Universal Resource Indicators (URIs), or Universal Resource Locaters (URLs)) and corresponding mailbox identifiers (mailbox IDs) associated with each of the device numbers. A mailbox ID may identify the mailbox used for storing voicemail messages for a corresponding device number. A mailbox ID may also identify the VM server (e.g., one of VM servers 232-236) with which the mailbox is associated, SWD 238 may also store information for associating multiple user devices, device numbers, or mailbox IDs with a single user, such as associating user devices 208-220 with the same user.

VVM server 252 may include one or more computer systems for hosting programs, databases, and/or applications. VVM server 252 may run a web server application to serve web pages when requested. VVM server 252 may allow a user to access voicemail message over a data network, for example, using computer 208. VVM server 252 may run a visual voicemail application. The VVM application may request voicemail messages and/or headers from one of VM servers 232-236 and may forward voicemail messages and/or headers to any one of devices 208-220 directly or through VVM gateway 262, device proxy 254, and/or SMPP gateway 256.

VVM database 253 may include one or more computer 5 stems for hosting programs, databases, and/or applications. VVM database 253 may store information related to the applications running in VVM server 252, for example. VVM database 253 may also store voicemail messages and/or headers received from VM servers 232-236 or information received from devices 208-220, for example.

Notification server 260 may receive voicemail message notifications (e.g., SMPP messages) from VM servers 232-236. Notification server 260 may pass notifications of voicemail messages received from VM servers 232-236 to VVM server 252 (e.g., as hypertext transfer protocol (HTTP) messages). Notification server 260 may include one or more computer systems for hosting programs, databases, and/or applications.

VVM gateway 262 may receive information about voicemail messages (e.g., voicemail message headers) from VM servers 232 and/or 236. The information may include lists of voicemail messages that may include data conforming for example, the IMAP protocol. VVM gateway 262 may pass voicemail message headers received from VM servers 232 and/or 236 to VVM server 252. VVM gateway 262 may pass data to VVM server 252 in the form of XML (eXtensible Markup Language) data in HTTP messages, for example. VVM gateway 262 may include one or more computer systems for hosting programs, databases, and/or applications.

Device proxy 254 may receive communications from one or more user devices 208-220 for forwarding to other devices (e.g., VVM server 252 and/or SMPP gateway 256). Device proxy 254 may also authenticate user devices (e.g., user devices 208-220) by, for example, communicating with authentication server 258. Authentication server 258 may store information related to device authentication, such as session cookies. Device proxy 254 may communicate with devices (e.g., user devices 208-220) using secure channels implementing, for example, SSL (Secure Socket Layer) protocols or TLS (Transport Layer Security) protocols.

SMPP gateway 256 may receive SMPP (e.g., SMS (Short Message System)) messages from device proxy 254 and pass the received SMPP messages to user devices, such as user devices 216-220. SMPP gateway 256 may also receive SMPP messages from user devices 216-220, for example, and pass the received SMPP messages to device proxy 254.

Transcoding server 270 may include one or more computer systems for hosting programs, databases, and/or applications. Transcoding server 270 may convert an audio, video, or graphic file from one format to another (e.g., from one bit rate to another bit rate, from one resolution to another, from one standard to another, from one file size to another, etc.). Transcoding server 270 may allow different audio, video, and/or graphic files to be displayed or played on any device in network 200. Examples of audio formats include MP3, WMA (Windows Media Audio), AAC (Advanced Audio Coding), QCP (Qualcomm Code Prediction), QCEP (Qualcomm Code Excited Linear Prediction), EVRC (Enhanced Variable Rate Codec), AMR (Adaptive Multi-Rate), etc. Transcoding server 270 may convert an audio file from any of these formats into any other one of these formats, for example, or into the same format but at a different rate, resolution, size, etc.

Self-provisioning serve 72 and MTAS server 274 may include one or more computer systems for hosting programs, databases, and/or applications. Self-provisioning server 272 and MTAS server 274 may store a database of information associating user names, device numbers, subscribed services and features, account commentary, account numbers, etc.

In other embodiments, network 200 may include more, fewer, or different devices. For example, network 200 may include a voice-to-text (V2T) server and a V2T engine server. Moreover, one or more devices 208-274 may perform one or more functions of any other device in network 200. Furthermore, one or more of devices 208-274 may be remotely located from each other, e.g., devices 208-274 may be geographically diverse. Although FIG. 2 shows devices 208-274 coupled in each other in a particular configuration, devices 208-274 may also be arranged in other configurations, either coupling directly with each other or through one or more networks, such that any one of devices 208-274 may communicate with any other one of devices 208-274. For example, any one of devices 208-274 may communicate with any other one of devices 208-274 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Figure 3:
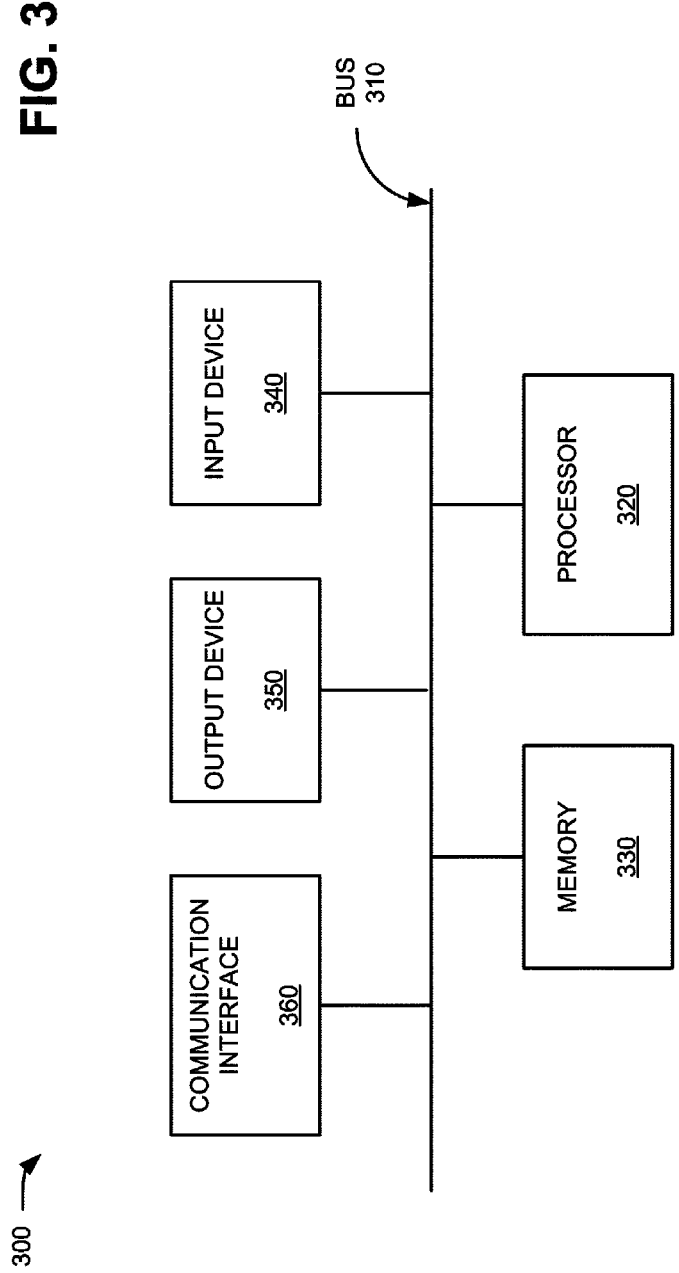
FIG. 3 illustrates an exemplary configuration of one or more of the components of FIG. 2.

FIG. 3 is a diagram of exemplary components of a device 300 that may correspond to devices implementing any one of devices 208-274. Each of devices 208-274 may include one or more devices 300. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 100.

As described herein, device 300 may perform certain operations in response to processor 320 executing machine-readable instructions contained in a computer-readable medium, such as memory 330. A computer-readable medium may include anon-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and machine-readable instructions.

Although FIG. 3 shows exemplary components of device 300, in other implementations, device 300 may include fewer components, different components, differently arranged components, or additional components than those depicted in FIG. 3. As an example, in some implementations, input device 340 and/or output device 350 may not be implemented in device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
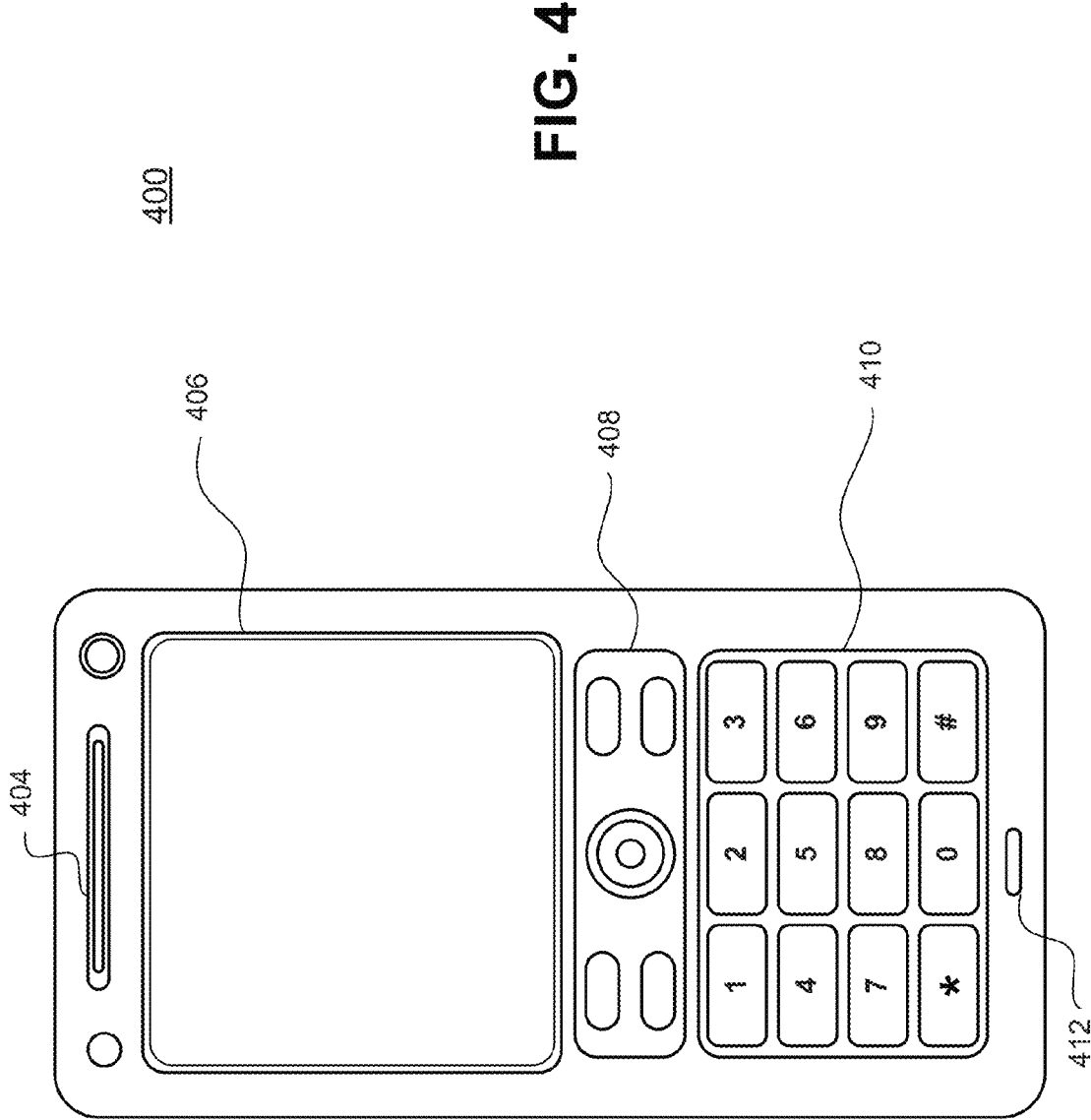
FIG. 4 is a Hock diagram of an exemplary user device.

FIG. 4 is diagram of an exemplary user device 400, such as one or more of user devices 208-220. As illustrated, user device 400 may include a speaker 404, a display 406, control keys 408, a keypad 410, and a microphone 412. User device 400 may include other components (not shown in FIG, 4) that aid in receiving, transmitting, and/or processing data. Moreover, other configurations of user device 400 are possible.

Speaker 404 may provide audible information to a user of user device 400. Display 406 may include a display screen to provide visual information to the user, such as video images or pictures, and may include a touch-screen display to accept inputs from the user. For example, display 406 may provide information regarding incoming or outgoing telephone calls, telephone numbers, contact information, current time, voicemail, email, etc. Display 406 may display a graphic user interface (not shown) that includes listings of available visual voicemails.

Control keys 408 may permit the user to interact with user device 400 to cause user device 400 to perform one or more operations, such as interacting with a visual voicemail application. Control keys 408 may include soft keys that may perform the functions indicated on display 406 directly above the keys. Keypad 410 may include a standard telephone keypad and may include additional keys to enable inputting (e.g., typing information into user device 400. Microphone 412 may receive audible information from the user.

Figure 5:
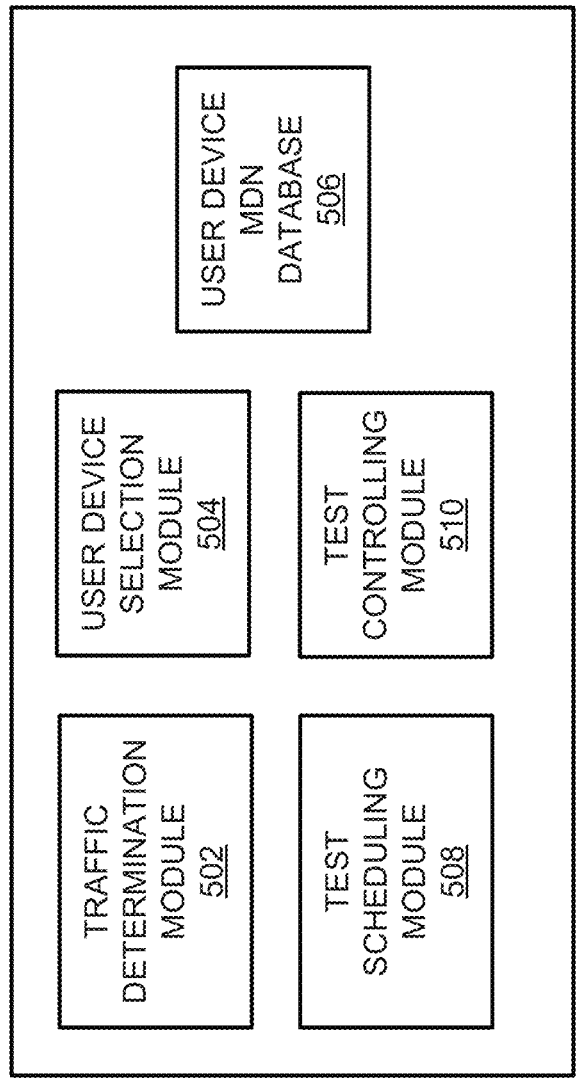
FIG. 5 is a diagram of exemplary network signals for implementing visual voicemail requests in a network.

FIG. 5 is a of exemplary functional components of a scalability testing device 500. In one implementation, the functions described in connection with FIG. 5 may be performed by one or more components of device 300 (FIG. 3). In another implementation, scalability testing device 500 may be implemented as a module in VVM server 252 or another one of the devices in network 200. As illustrated, scalability testing device 500 may include a traffic determination module 502, a user device selection module 504, a user device mobile directory number (MDN) database 506, a test scheduling module 508, and a test controlling module 510. Scalability testing device 500 may include other components (not shown in FIG. 5) that aid in implementing scalability testing for VVM services in network 200. The particular arrangement and number of components in scalability testing device 500 as shown in FIG. 5 are illustrated for simplicity.

Traffic determination module 502 may determine peak interval traffic intensity or volume in a network, such as network 200. For example, with reference to FIG. 1, traffic determination module 502 may determine a number of requests for VVM services at 15 minute intervals. Traffic determination module 502 may identify when the number of requests (i.e., usage volume) is highest.

User device selection module 504 may select a plurality of user devices to implement scalability testing in network 200. For example, user device selection module 506 may identify user devices that may be used for implementation of scalability testing (e.g., users associated with the user devices may opt in to a testing program). User device selection module 504 may store MDNs for identified user devices in user device MDN database 506. Alternatively, user device selection module 504 may store MDNs for an identified subgroup of user devices in user device MDN database 506. Although user device MDN database 504 is described with respect to scalability testing device 500, user device MDN database 504 may be implemented in other parts of network 200. The participating user devices may be either selected without explicit acknowledgement from an associated user or the user may be invited to authorize administrators of the network to use the user device in the scalability test.

Test scheduling module 508 may schedule a time for implementing scalability testing. For example, test scheduling module 508 may identify a predetermined maintenance window during which maintenance tasks, including scalability testing, may be implemented. Test scheduling module 508 may schedule the time for implementing scalability testing based on a low usage volume (i.e., number of requests for VVM services in the network) associated with that time.

Test controlling module 510 may implement testing of scalability by sending a message to selected user devices that instructs the selected user devices in request VVM services at a particular time(s). The message may be formatted as described with respect to scalability instruction table 600 and FIG. 6 below.

According to one implementation, test controlling module 510 may select a number of participating user devices based on a target rate of VVM server transactions (or requests for VVM services) and a number of requests required per user device to achieve this target rate of VVM server transactions. More participating user devices may correspond to fewer requests sent per participating user devices. Similarly, if test controlling module 510 identifies fewer participating user devices, test controlling module 510 may increase a number of requests that are to be sent per participating user device during the scalability testing time. Test controlling module 510 may assign a zero charge rate for data consumption for participating user devices for requests sent during scalability testing (i.e., data consumption in this instance should be free).

According to another implementation, test controlling module 510 may instruct the participating user devices to gradually increase a number of requests per interval. Administrative personnel may monitor performance of the network and may cancel the increased requests if problems are detected during the scalability testing prior to the requests for VVM services reaching the peak interval traffic intensity.

FIG. 6 is a diagram of an exemplary scalability instruction table 600. Scalability instruction table 600 may store information related to a system text message that may instruct a plurality of user devices to request VVM services. Each entry (e.g., record) in scalability instruction table 600 may include information regarding a different user device.

Scalability instruction table 600 may be stored in a database accessible by or associated with scalability testing device 500 and/or VVM server 252, such as VVM database 253.

Scalability instruction table 600 may include an MDN field 602, an application ID field 604, a task status field 606, a purpose field 608, a time field 610, and a requests field 612.

MDN field 602 may store an identifier for a user device that is to receive an instruction for implementing scalability testing in network 200. For example, instruction 652 in table 600 stores an MDN of a user device. MDN1, in MDN field 602. Instructions 652 to 660 may each include a corresponding MDN (i.e., MDN1 to MDN5), for user devices, such as any of devices 208-220.

Application ID field 604 may store an identifier of an application associated with the scalability testing in network 200. For example, instruction 652 in table 600 stores an application ID, //VZWVVMBB5001:VVM, in application ID field 604.

Task status field 606 may store a value identifying a status of a task associated with the scalability testing. For example, a value of 1 may indicate that the user device is to implement the task. A value of 0 may indicate that the user device is to cancel the task (i.e., the scheduled task for scalability testing is "no go").

Purpose field 608 may include an identifier of a purpose of the particular instruction, For example, the purpose of the instruction in purpose field 608 is to perform a scalability test, SCALE.

Time field 610 may identify when the user device is to perform the task. For example, time field 610 includes an identifier 0315AMEST11202011 which indicates that the test will be started at a particular time, 03:15 AM EST on a particular date, 11/20/2011.

Requests field 612 may identify an instruction that the user device is to follow in implementing the scalability test. For example, request field 612 includes an instruction, TRY3INTERVAL5, which indicates that the user device is ordered to send 3 requests in total to VVM production server, one every five minutes. Request field 612 or another field (not shown) may indicate a particular test VVM request and/or message that the user device is to send during the test. The user device may send the requests silently (i.e., without providing indication to a user of the user device that the requests are being sent). In other instances, the user device may display a message to the user indicating that a test is occurring.

VVM server 252 may send an instruction to a mobile client of each user device via SMS before the scalability sting is to be implemented (e.g., after production servers are deployed). For example, VVM server 252 may construct a signature SMS based on table 600 as shown in the following example:
//VZWVVMBB5001:
VVM1SCALE0315AMEST11202011TRY3INTERVAL5.

VVM server 252 may cancel the scalability test by sending the following SMS to each of the user devices based on MDN 602:
//VZWVVMBB5001:
VVM0SCALE0315AMEST11202011TRY3INTERVAL5.

In this case, the zero in the SMS after "VVM" indicates that the test should be cancelled.

Figure 7:
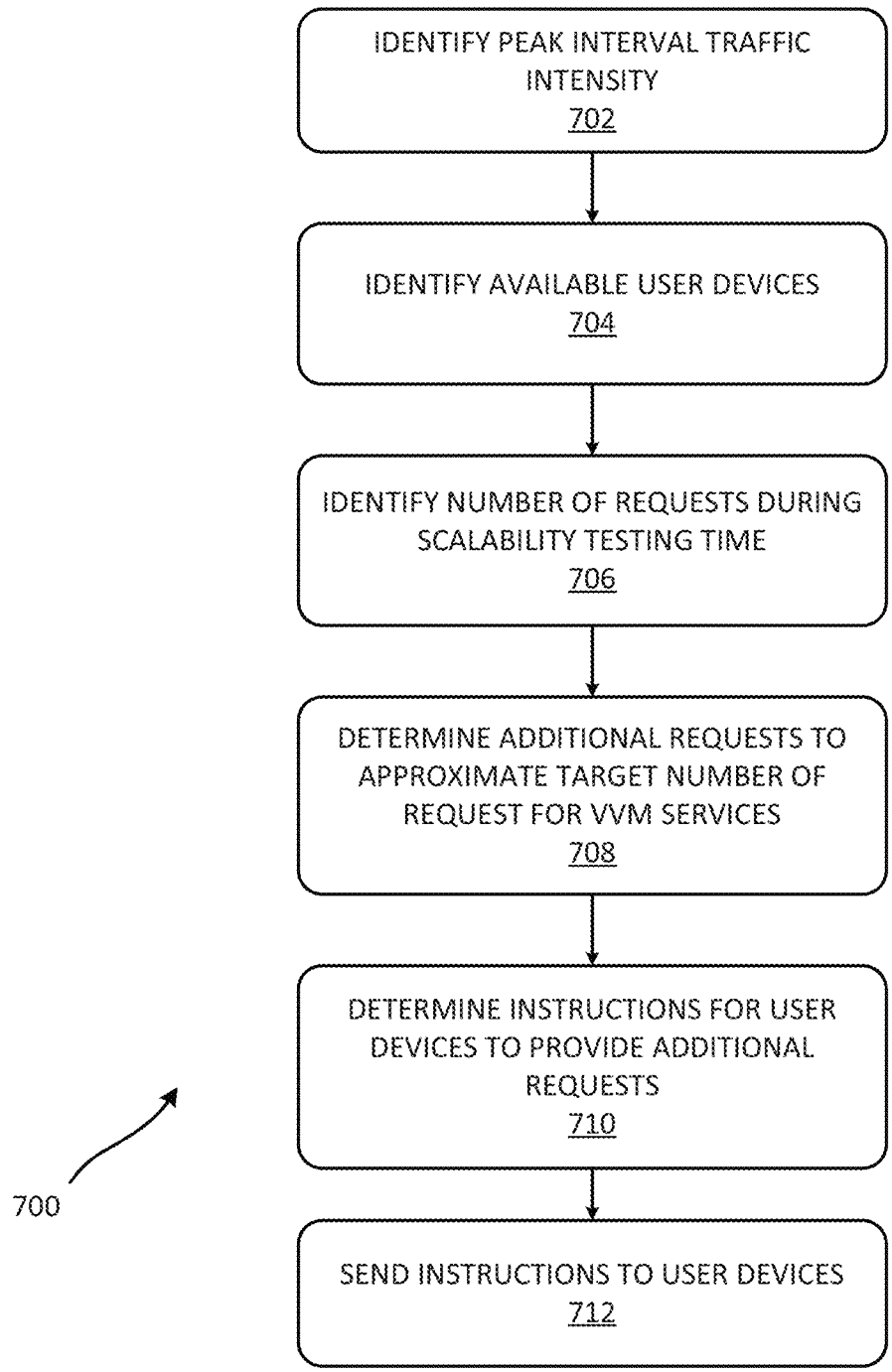
FIG. 7 is a flowchart of an exemplary process for implementing scalability testing for VVM services in a network.

FIG. 7 is a flowchart of an exemplary process 700 for performing a scalability test in network 200. FIG. 7 is discussed in relation to FIG. 8, which is a diagram of exemplary network signals for performing a scalability test. In one implementation, process 700 may be performed by VVM server 252. In another implementation, some or all of process 700 may be performed by another device or group of devices, including or excluding VVM server 252.

As discussed above, VVM server 252 may identify peak interval traffic intensity in network 200 (block 702 in FIG. 7). For example, VVM server 252 may count a number of hypertext transfer protocol (HTTP) requests received by VVM server 252, from user devices, at particular intervals over designated times (e.g., VVM server 252 may determine a number of HTTP requests received every 15 minutes each day). VVM server 252 may identify when a number of requests is highest.

VVM server 252 may identify user devices that may be available for scalability testing of the network (block 704 in FIG. 7). For example, VVM server 252 may access a list of MDNs and user devices that are indicated as available for participating in scalability testing for the network.

At block 706, VVM server 252 may identify a number of HTTP requests that are received during a prospective scalability testing time, such as a predetermined maintenance window for the network. For example, VVM server 252 may count a number of HTTP requests received by VVM server 252, from user devices, during the predetermined maintenance window.

VVM server 252 may determine a number of additional requests HTTP requests) for VVM services, to VVM server 252 from user devices during the predetermined window that may approximate a target level of requests for VVM services (block 708). The target level of requests may be selected based on a scalability testing strategy of network administrators. For example, VVM server 252 may determine a number of additional requests that may be combined with the number of requests for VVM services during the predetermined window to approximate the peak hour intensity. For example, as described with respect to FIG. 1, VVM server 252 may subtract the number of HTTP requests during the predetermined window (<20,000) from the number of HTTP requests received at peak hour intensity (>120,000). In this case the determined number of additional requests is greater than 100,000. In other scalability testing scenarios, the target level of request may be set above peak interval traffic intensity to provide leeway in network 200 for unexpected surges beyond the peak interval traffic intensity.

VVM server 252 may determine instructions for user devices to provide the determined number of additional HTTP requests (block 710). For example, VVM server 252 may determine a customized system text message that is to be sent to user devices that are indicated for providing additional requests, such as described with respect to scalability instruction table 600 above.

Figure 8:
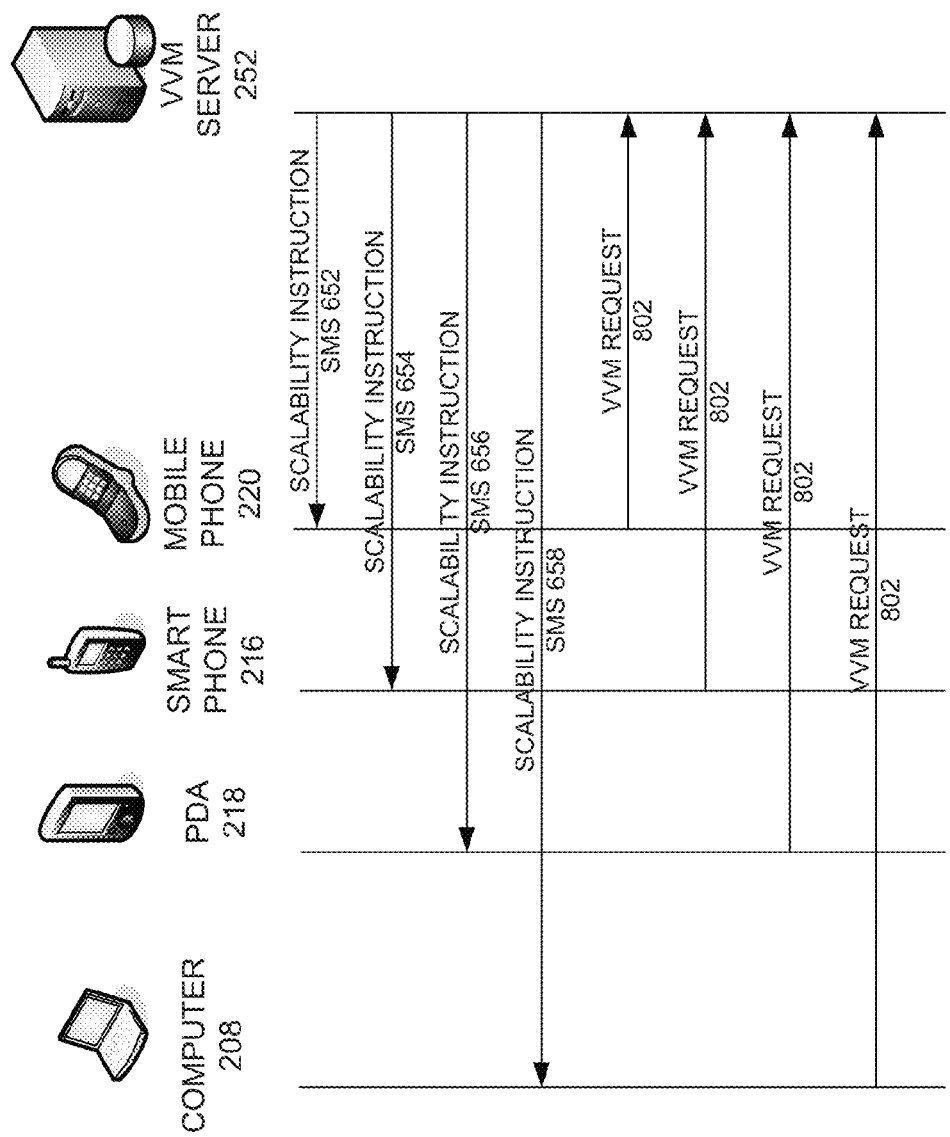
FIG. 8 is a diagram of exemplary network signals for implementing sea testing for VVM services in a network.

VVM server 252 may send the instructions to the user devices (block 712 of FIG. 7, scalability instruction SMS 652, 654, 656 and 658 in FIG. 8). The instructions may include a customized system text message that is sent to a VVM client of the user device. The instructions may also include a customized test message that is to be sent by the user device at the designated time(s). The system text message may be intercepted by the VVM client and may not be directly viewed by the user.

Each user device may transmit the indicated requests at a time specified in the instruction (VVM request 802 in FIG. 8). Scalability testing may be implemented at this time. The VVM mobile clients may send a desired volume of HTTP requests during the maintenance winch w right after server deployment is completed so that the scalability of the deployment may be tested.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of blocks have been described with respect to FIG. 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to scalability testing for VVM services in a network, in other implementations, scalability testing may be applied to additional services provided in a VM system.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, similar methodology may be used for volume based testing of other types of applications associated with voicemail in a network. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
identifying a peak interval traffic intensity for requests for visual voicemail (VVM) services in a network, wherein the peak interval traffic intensity in the network occurs when a number of requests for the VVM services is highest over a predetermined interval;
identifying a plurality of user devices available for implementing scalability testing, wherein scalability testing identifies scalability of network performance of the VVM services to high transaction volumes;
identifying a number of requests for VVM services during a prospective time for scalability testing in the network;
determining a number of additional requests for VVM services from the plurality of user devices that approximates the peak interval traffic intensity during the prospective time for scalability testing in the network;
determining instructions for at least one of the plurality of user devices to provide the determined number of additional requests; and
sending the determined instructions to the at least one of the plurality of user devices.

2. The computer-implemented method of claim 1, wherein identifying the peak interval traffic intensity further comprises:
identifying a highest average number of requests for VVM services over the predetermined interval.

3. The computer-implemented method of claim 1, wherein identifying the plurality of user devices available for implementing scalability testing further comprises:
identifying mobile device numbers (MDNs) associated with each of the plurality of user devices; and
wherein users associated with each of the plurality of user devices have authorized use of their respective user devices for a scalability test.

4. The computer-implemented method of claim 1, wherein determining the number of additional requests to approximate the peak interval traffic intensity further comprises:
subtracting the number of requests for VVM services during the prospective time for scalability testing from the peak interval traffic intensity for VVM services.

5. The computer-implemented method of claim 1, wherein the user device comprises one of a mobile telephone, a tablet computer device, or a personal computer.

6. The computer-implemented method of claim 1, wherein determining instructions for the at least one of the plurality of user devices to provide the determined number of additional requests further comprises:
determining a number of request for the at least one of the plurality of user devices.

7. The computer-implemented method of claim 1, wherein sending the determined instructions to the at least one of the plurality of user devices further comprises:
sending an short message system (SMS) message including an identifier of an application, a task status, a purpose of the SMS message, a time to begin requesting VVM services, and an instruction for requesting the VVM services.

8. The computer-implemented method of claim 1, further comprising:
identifying the prospective time for scalability testing in the network based on a low number of requests associated with the prospective time.

9. The computer-implemented method of claim 1, wherein determining instructions for at least one of the plurality of user devices to provide the determined number of additional requests further comprises:
determining the instructions to gradually increase a number of requests per interval.

10. A method, comprising:
receiving, at a user device, an instruction to provide a request for visual voicemail (VVM) services in a network, wherein the instruction includes an identifier of an application, a task status, a purpose of an SMS message, a time to begin requesting VVM services, and an instruction for requesting the VVM services, wherein the instruction for requesting the VVM services is to generate a peak interval traffic intensity in the network VVM services over a predetermined interval; and
providing the request at the time assigned in the instruction, wherein the request is one of a plurality of requests to approximate a peak interval traffic intensity during a prospective time for scalability testing in the network.

11. The method of claim 10, wherein data consumption charges associated with sending of the request for VVM services is zero.

12. A device, comprising:
a memory to store a plurality of instructions; and
a processor configured to execute instructions in the memory to:
identify a peak interval traffic intensity for requests for at least one application associated with voicemail in a network, wherein the peak interval traffic intensity in the network occurs when a number of requests for the at least one application associated with voicemail is highest over a predetermined interval;
identify a plurality of user devices available for implementing scalability testing, wherein scalability testing identifies scalability of network performance of the at least one application associated with voicemail to high transaction volumes;
identify a number of requests for the application associated with voicemail during a prospective time for scalability testing in the network;
determine a number of additional requests for the application associated with voicemail from the plurality of user devices that approximates the peak interval traffic intensity during the prospective time for scalability testing in the network;
generate instructions for the plurality of user devices to provide the determined number of additional requests; and
send the generated instructions to the plurality of user devices.

13. The device of claim 12, where, when identifying the peak interval traffic intensity, the processor is further configured to:
identify a highest average number of requests for the application associated with voicemail over a predetermined interval.

14. The device of claim 12, where, when identifying the plurality of user devices available for implementing scalability testing, the processor is further configured to:
identify mobile device numbers (MDNs) associated with each of the plurality of user devices; and
wherein users associated with each of the plurality of user devices have authorized use of the each of the plurality of user devices for a scalability test.

15. The device of claim 12, where, when determining the number of additional requests to approximate the peak interval traffic intensity, the processor is further configured to:
  subtract the number of requests for the application associated with voicemail during the prospective time for scalability testing from the peak interval traffic intensity for the application associated with voicemail.

16. The device of claim 12, wherein, when generating instructions for plurality of user devices to provide the determined additional requests, the processor is further configured to:
  determine a number of requests for each of the plurality of user devices.

17. The device of claim 12, wherein, when sending the generated instructions to the plurality of user devices, the processor is further configured to:
  send an SMS message including an identifier of an application, a task status, a purpose of the SMS message, a time to begin requesting the application associated with voicemail, and an instruction for requesting the application associated with voicemail.

18. The device of claim 12, wherein the processor is further configured to:
  generate the instructions to gradually increase a number of requests per interval.

19. A non-transitory computer-readable medium including instructions to be executed by a processor, the instructions including one or more instructions, which when executed by the processor, cause the processor to:
  identify a peak interval traffic intensity for requests for visual voicemail (VVM) services in a network, wherein the peak interval traffic intensity in the network occurs when a number of requests for the VVM services is highest over a predetermined interval;
  identify a plurality of user devices available for implementing scalability testing, wherein scalability testing identifies scalability of network performance of the VVM services to high transaction volumes;
  identify a number of requests for VVM services during a prospective time for scalability testing in the network;
  determine a number of additional requests for VVM services from the plurality of user devices that approximates a target level of requests for VVM services during the prospective time for scalability testing in the network;
  generate instructions for at least one of the plurality of user devices to provide the determined number of additional requests; and
  send the generated instructions to the at least one of the plurality of user devices.

20. The non-transitory computer-readable medium of claim 19, wherein the one or more instructions further includes instructions to:
  determine the target level of requests for VVM services based on the peak interval traffic intensity.

* * * * *